(12) United States Patent
Huang

(10) Patent No.: US 11,698,102 B1
(45) Date of Patent: Jul. 11, 2023

(54) SELF-LUBRICATING TIE-DOWN

(71) Applicant: Han-Ching Huang, Taichung (TW)

(72) Inventor: Han-Ching Huang, Taichung (TW)

(*) Notice: Subject to any disclaimer, the term of this patent is extended or adjusted under 35 U.S.C. 154(b) by 0 days.

(21) Appl. No.: 17/574,488

(22) Filed: Jan. 12, 2022

(51) Int. Cl.
*B65B 13/22* (2006.01)
*B60P 7/08* (2006.01)
*F16C 33/10* (2006.01)
*F16C 17/02* (2006.01)

(52) U.S. Cl.
CPC ........ *F16C 33/1095* (2013.01); *B60P 7/0823* (2013.01); *F16C 17/02* (2013.01); *Y10T 24/2175* (2015.01)

(58) Field of Classification Search
CPC ..... B60P 7/0838; B60P 7/0846; B60P 7/0853; B60P 7/0823; B60P 7/083; Y10T 24/21; Y10T 24/2175; Y10T 24/2121
See application file for complete search history.

(56) References Cited

U.S. PATENT DOCUMENTS

| | | | |
|---|---|---|---|
| 2004/0155230 A1* | 8/2004 | Fortin | B60P 7/083 254/222 |
| 2008/0189921 A1* | 8/2008 | Tomosue | B65D 63/16 24/68 R |
| 2010/0300225 A1* | 12/2010 | Ruan | B60P 7/083 74/142 |
| 2021/0237639 A1* | 8/2021 | Zhu | B60P 7/0846 |

* cited by examiner

*Primary Examiner* — Robert Sandy
*Assistant Examiner* — Michael S Lee
(74) *Attorney, Agent, or Firm* — Bruce Stone LLP; Joseph A. Bruce

(57) ABSTRACT

A self-lubricating tie-down includes a frame including two walls, a reel, two ratchet wheels, two detents, a short strap and a long strap. The frame includes two walls each of which is formed with a bushing. The handle includes two blades each of which is formed with an aperture. The reel includes two terminal sections inserted in the bushings. The two ratchet wheels are connected to the reel. The first detent is movable on the frame and operable for engagement with the ratchet wheels. The second detent is movable on the handle and operable for engagement with the ratchet wheels. The short strap includes an end connected to the frame. The long strap includes an end connected to the reel so that the reel is operable to wind the long strap. Each of the bushings includes at least one recess and lubricant filled in the recess.

10 Claims, 9 Drawing Sheets

SELF-LUBRICATING TIE-DOWN

BACKGROUND OF INVENTION

1. Field of Invention

The present invention relates to a tie-down and, more particularly, to a self-lubricating tie-down.

2. Related Prior Art

Referring to the FIG. 1, a typical tie-down 10 includes a frame 20, a handle 30, a reel 40, two ratchet wheels 50, two detents 60 and 70, and two straps 80 and 90. The frame 20 includes a base 22 formed between two walls 24. Each of the walls 24 includes a bushing 26 and a slot 28. Preferably, the bushings 26 extend toward each other. Each of the bushings 26 is in the form of a ring extending from an internal side of a corresponding of the walls 24.

The strap 80 includes an end tied to a hook 82 and another end tied to a crossbar 84. The crossbar 84 includes two ends respectively connected to the walls 24.

The handle 30 includes a grip 32 formed between two blades 34. Each of the blades 34 of the handle 30 includes an aperture 36 and a slot 38.

The reel 40 is in the form of an axle or shaft including two terminal sections 42. The terminal sections 42 are inserted in and supported by the bushing 26.

Each of the ratchet wheels 50 is formed with ratchets 52. The ratchet wheels 50 are connected to the reel 40 so that the terminal sections 42 of the reel 40 extend beyond the ratchet wheels 50.

The detent 60 includes two fins 62 and a protuberance 64. The fins 62 are movably inserted in the slots 28 of the walls 24 of the frame 20. Each of the fins 62 is used to engage with the ratchets 52 of a corresponding one of the ratchet wheels 50.

A spring 66 is supported on the protuberance 64. The spring 66 is compressed between the detent 60 and a tab (not numbered) raised from the base 22 of the frame 20 for keeping the fins 62 in engagement with the ratchets 52.

The strap 90 includes an end connected to a hook 92 and another end connected to the reel 40. The strap 90 can be wound on the reel 40.

The detent 70 includes two fins 72 and a protuberance 74. The fins 72 are movably inserted in the slots 38 of the blades 34 of the handle 30. Each of the fins 72 is used to engage with the ratchets 52 of a corresponding one of the ratchet wheels 50.

A spring 76 is supported on the protuberance 74. The spring 76 is a torque spring provided between the detent 70 and a proper portion of the handle 30 to keep the fins 72 in engagement with the ratchets 52.

As mentioned above, the terminal sections 42 of the reel 40 are inserted in and supported by the bushing 26. The terminal sections 42 of the reel 40 are expected to rotate smoothly on the bushing 26 to allow smooth winding and unwinding of the strap 90. However, the terminal sections 42 of the reel 40 can be jammed by the bushings 26 when rust occurs between them after the tie-down 10 is used for some time. In such case, the winding and unwinding of the strap 90 is unsmooth and this is not desirable.

The present invention is therefore intended to obviate or at least alleviate the problems encountered in prior art.

SUMMARY OF INVENTION

It is the primary objective of the present invention to provide a self-lubricating tie-down.

To achieve the foregoing objective, the self-lubricating tie-down includes a frame including two walls each of which is formed with a bushing, a handle including two blades each of which is formed with an aperture, a reel including two terminal sections inserted in the bushings, two ratchet wheels connected to the reel, a first detent movable on the frame and operable for engagement with the ratchet wheels, a second detent movable on the handle and operable for engagement with the ratchet wheels, a short strap including an end connected to the frame, and a long strap including an end connected to the reel so that the reel is operable to wind the long strap. Each of the bushings includes at least one recess and lubricant filled in the recess.

Other objectives, advantages and features of the present invention will be apparent from the following description referring to the attached drawings.

BRIEF DESCRIPTION OF DRAWINGS

The present invention will be described via detailed illustration of five embodiments referring to the drawings wherein.

DETAILED DESCRIPTION OF PREFERRED EMBODIMENT

According to a first embodiment of the present invention, a self-lubricating tie-down includes the tie-down 10 described with reference to FIG. 1 and features to be described with reference to FIGS. 2 and 3. That is, the self-lubricating tie-down includes all the elements of the tie-down 10.

Figure 2:
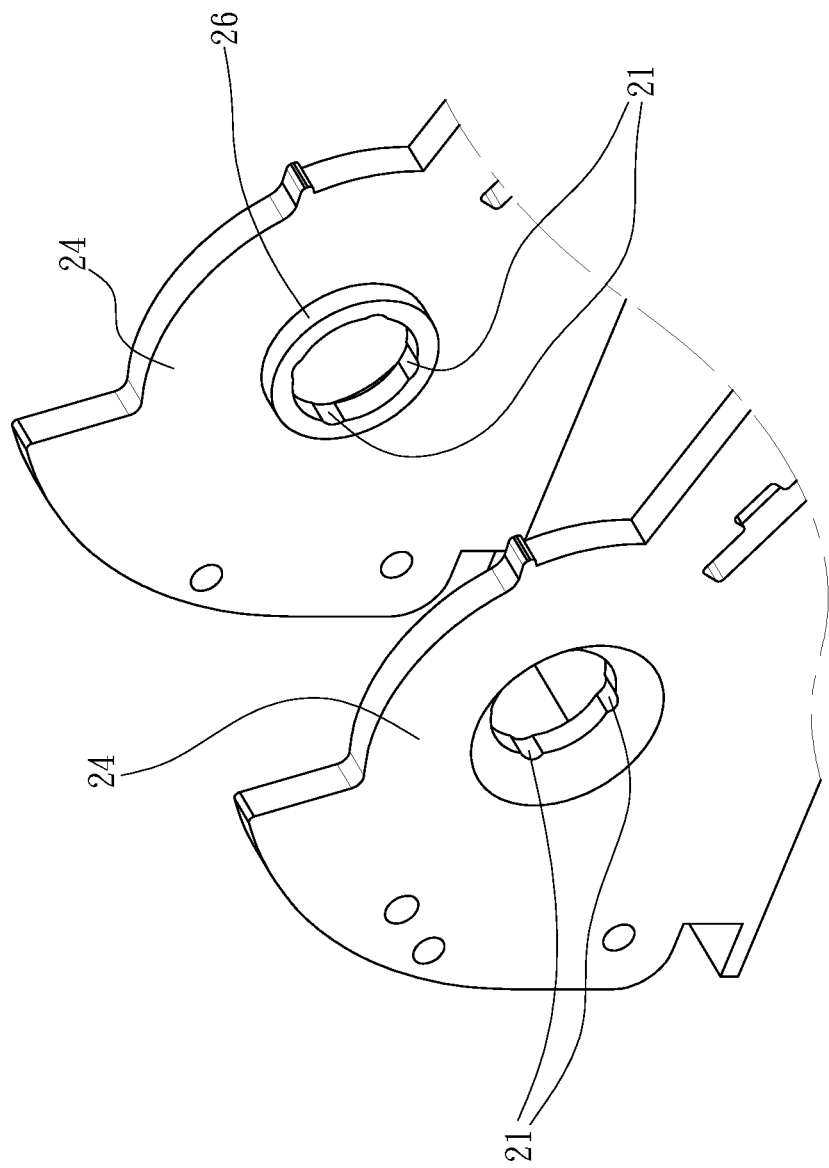
FIG. 2 is a partial and perspective view of a frame of a self-lubricating tie-down according to the first embodiment of the present invention.
Figure 3:
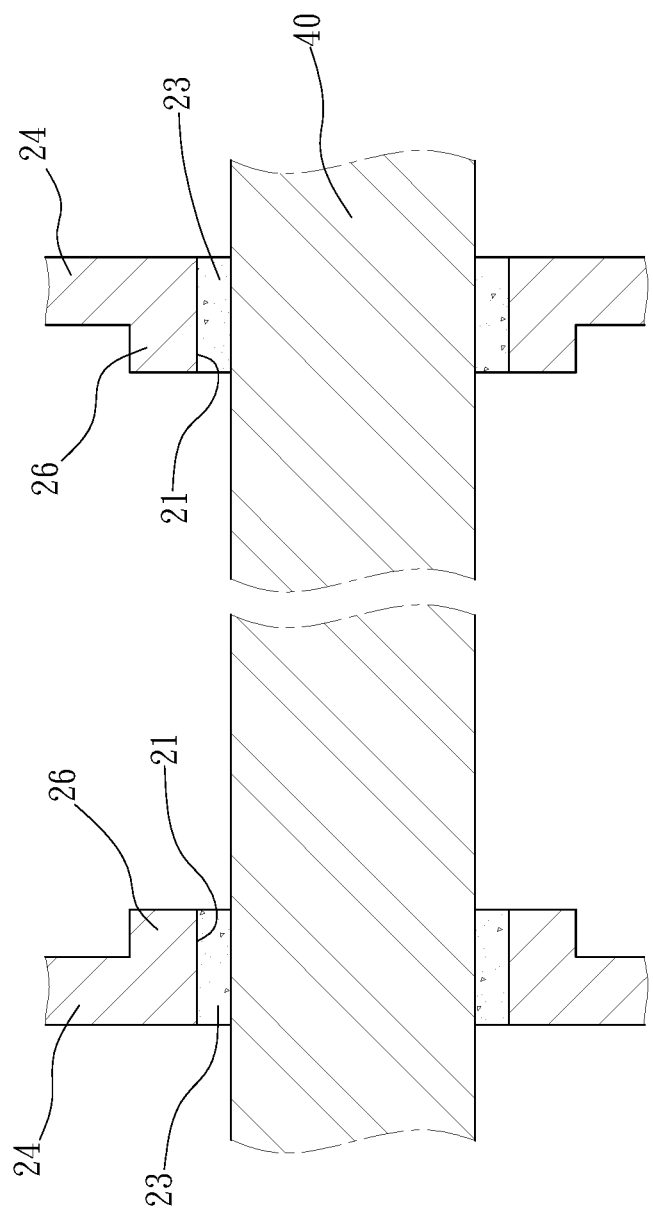
FIG. 3 is a partial and cross-sectional view of a reel in addition to the frame shown in FIG. 2.

Referring to FIGS. 2 and 3, each of the bushings 26 includes several longitudinal grooves 21 in an internal face. Each of the longitudinal grooves 21 includes two open ends. Lubricant 23 is filled in each of the longitudinal grooves 21. The lubricant 23 is preferably made with high viscosity. That is, the lubricant 23 is in the form of paste. Hence, the lubricant 23 remains in the longitudinal grooves 21, with little risk of leakage.

Figure 1:
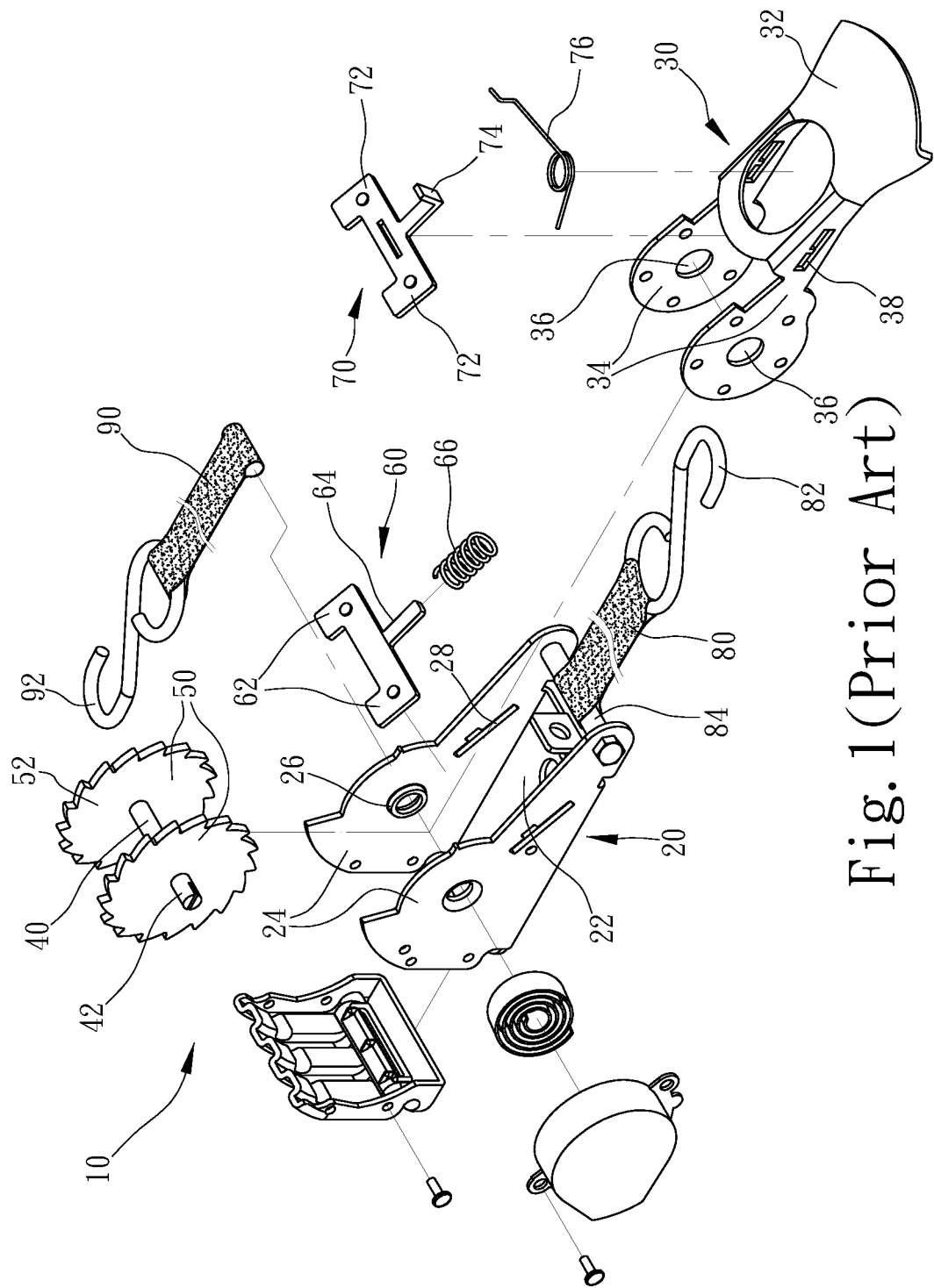
FIG. 1 is an exploded view of a typical tie-down.

Referring to FIGS. 1 through 3, the reel 40 is inserted in the bushings 26. Thus, the reel 40 is supported by the bushings 26. Some of the lubricant 23 enters a gap between the reel 40 and the bushings 26, there forming a film. The film of lubricant 23 prevents the reel 40 from direct contact with the bushings 26, thereby allowing the reel 40 to rotate relative to the bushings 26. The film of lubricant 23 prevents the reel 40 and the bushings 26 from wearing away each other. The film of lubricant 23 prevents the reel 40 and the bushings 26 from air and moisture. Hence, the lubricant 23 keeps the reel 40 and the bushings 26 from rust and hence keeps the reel 40 smoothly rotatable relative to the bushings 26. Referring to FIG. 3, each of the longitudinal grooves 21 extends in a longitudinal direction of the reel 40.

Figure 4:
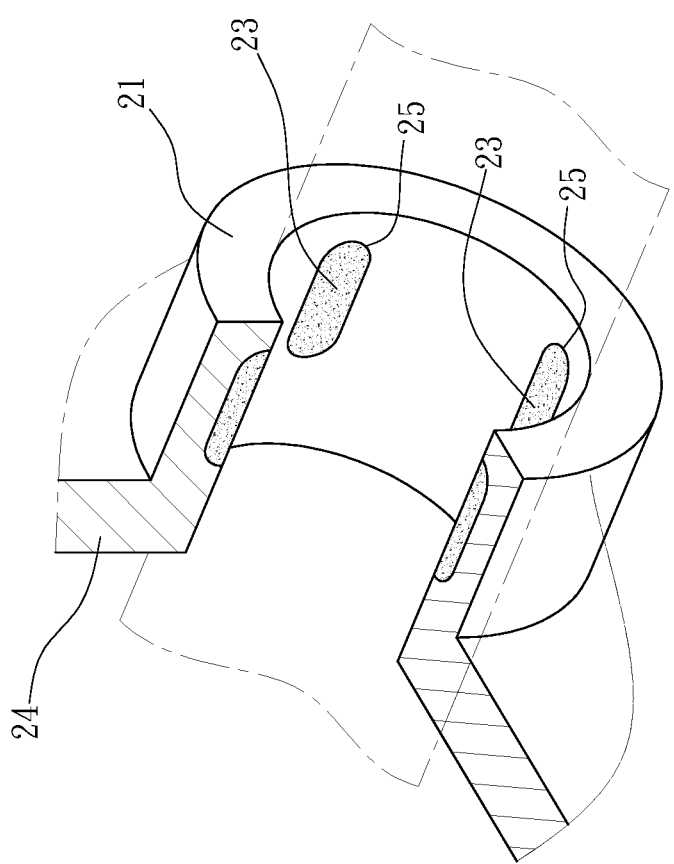
FIG. 4 is a partial and cut-away view of a frame of a self-lubricating tie-down according to the second embodiment of the present invention.

Referring to FIG. 4, shown is a self-lubricating tie-down according to a second embodiment of the present invention. The second embodiment is identical to the first embodiment except for including several longitudinal grooves 25 instead of the longitudinal grooves 21. The longitudinal grooves 25 are filled with the lubricant 23. Each of the longitudinal grooves 25 includes two closed ends. Thus, the longitudinal grooves 25 retain the lubricant 23 better than the longitudinal grooves 21.

Figure 5:
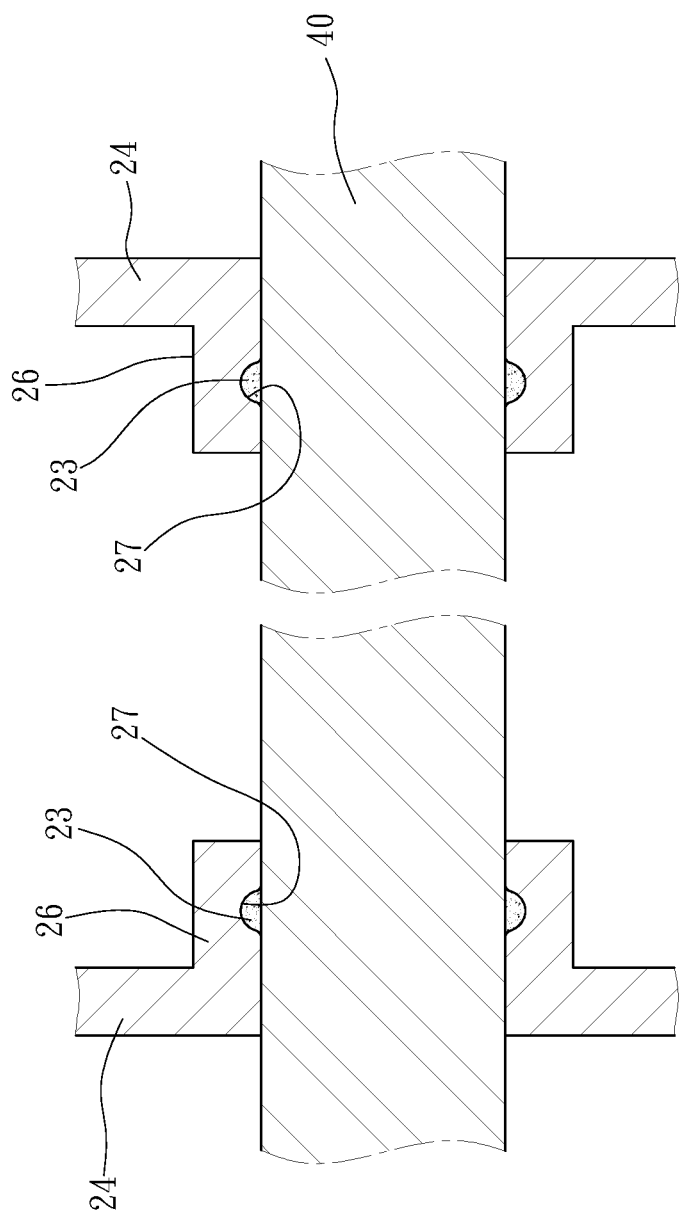
FIG. 5 is a partial and cross-sectional view of a frame of a self-lubricating tie-down according to the third embodiment of the present invention.
Figure 6:
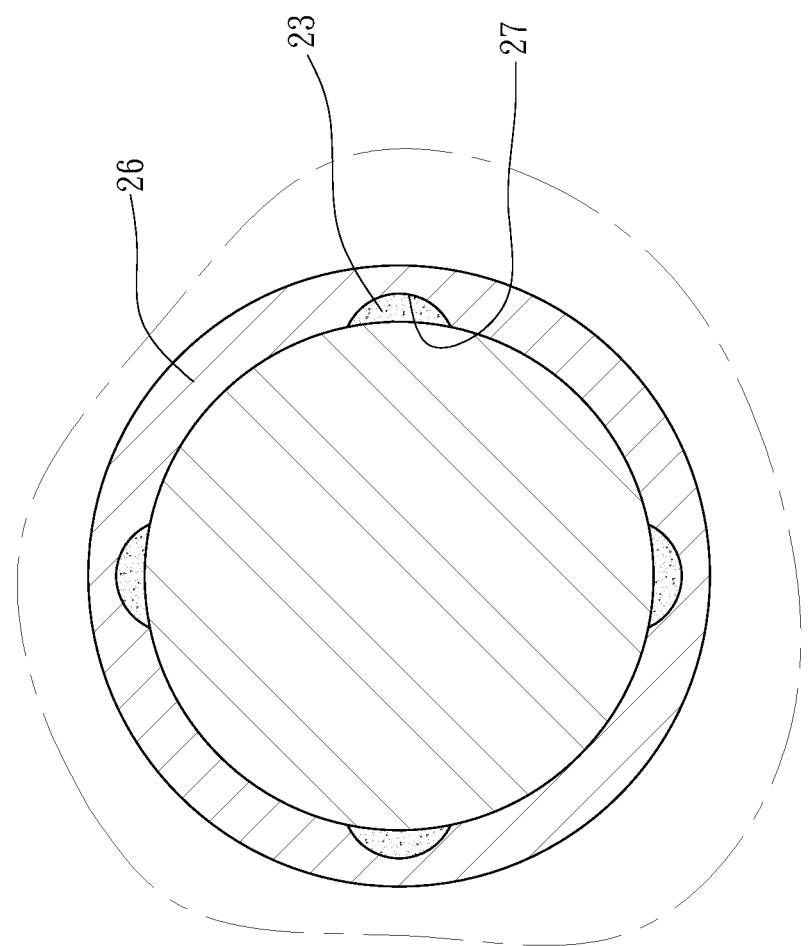
FIG. 6 is another partial and cross-sectional view of the self-lubricating tie-down shown in FIG. 5.

Referring to FIGS. 5 and 6, shown is a self-lubricating tie-down according to a third embodiment of the present invention. The third embodiment is identical to the second embodiment except for including several bores 27 instead of the longitudinal grooves 25. The bores 27 are filled with the lubricant 23. Each of the bores 27 is in the form of a dot.

Figure 7:
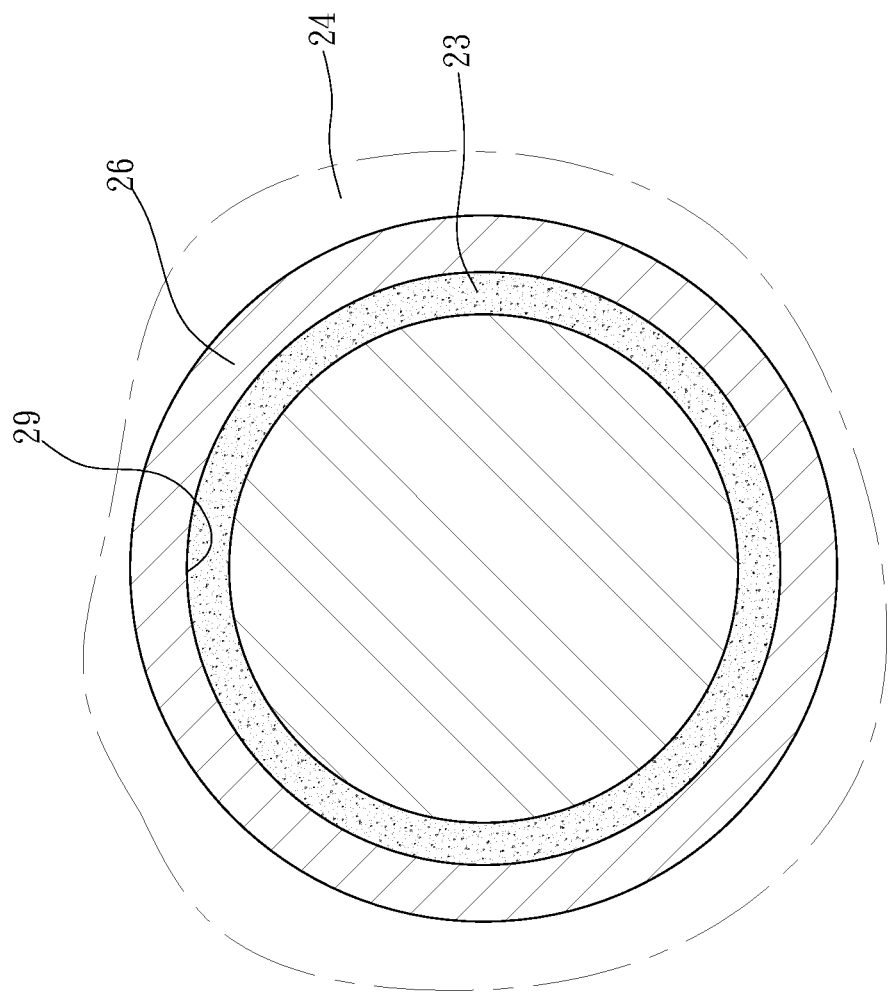
FIG. 7 is a partial and cross-sectional view of a frame of a self-lubricating tie-down according to the fourth embodiment of the present invention.

Referring to FIG. 7, shown is a self-lubricating tie-down according to the fourth embodiment of the present invention. The fourth embodiment is identical to the first embodiment except for including an annular groove 29 instead of the longitudinal grooves 21. The annular groove 29 is filled with the lubricant 23.

Figure 8:
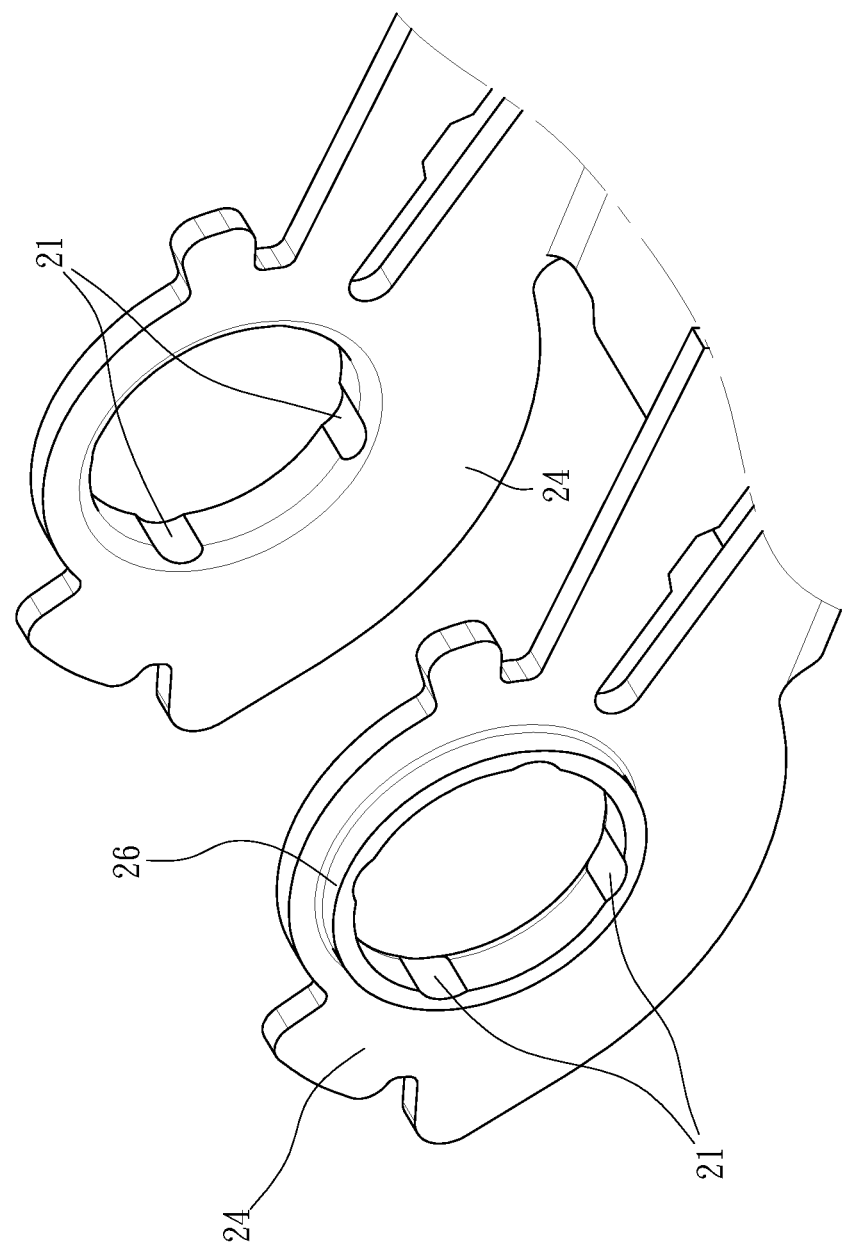
FIG. 8 is a partial and perspective view of a frame of a self-lubricating tie-down according to the fifth embodiment of the present invention.
Figure 9:
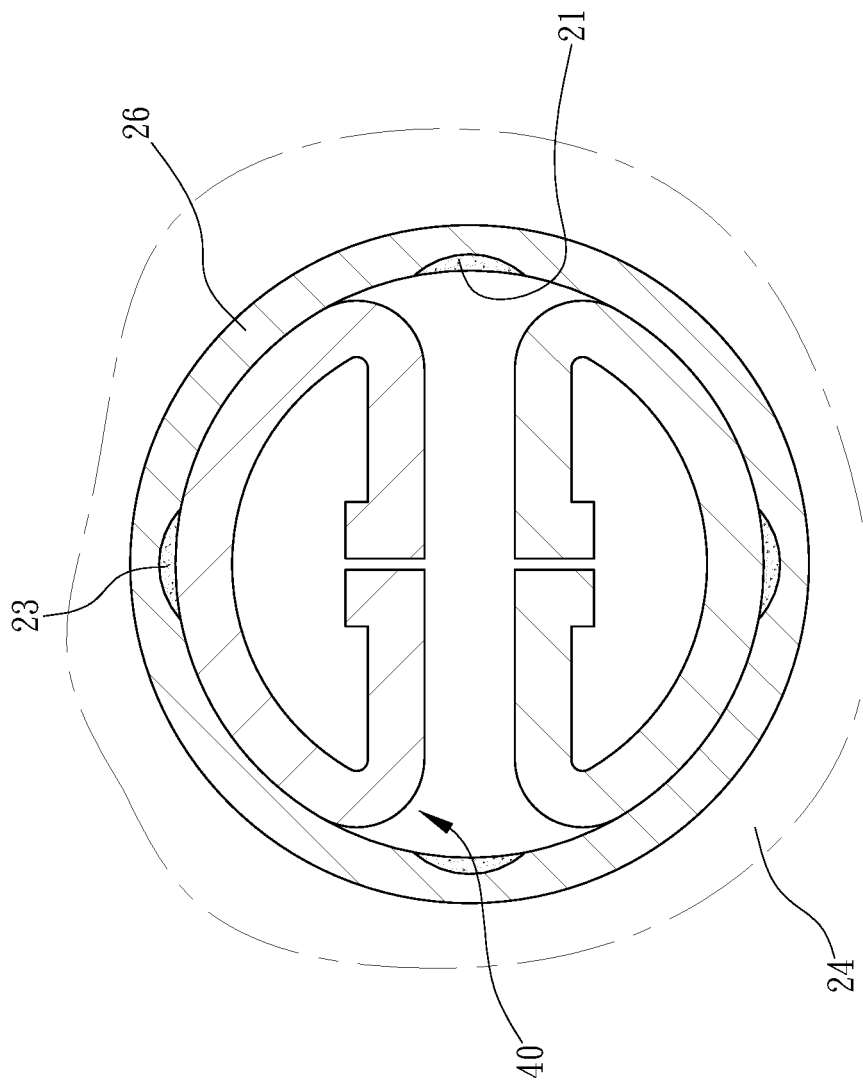
FIG. 9 is a partial and cross-sectional view of a reel in addition to the frame shown in FIG. 8.

Referring to FIGS. 8 and 9, shown is a self-lubricating tie-down according to the fifth embodiment of the present invention. The fifth embodiment is identical to the first embodiment except for that the bushings 26 extend away from each other. That is, each of the bushings 26 is formed on an external side of the corresponding wall 24.

In another embodiment of the present invention, several arched grooves are used instead of the single annular groove 29. That is, the single annular groove 29 is divided into several arched grooves.

The longitudinal grooves 21 and 25, the bores 27 and the annular groove 29 are recesses. Recesses in other shapes can be used in the bushings 26 of the frame 20 of the self-lubricating tie-down.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. A self-lubricating tie-down comprising a frame comprising two walls each of which is formed with a bushing, a handle comprising two blades each of which is formed with an aperture, a reel comprising two terminal sections inserted in the bushings, two ratchet wheels connected to the reel, a first detent movable on the frame and operable for engagement with the ratchet wheels, a second detent movable on the handle and operable for engagement with the ratchet wheels, a short strap comprising an end connected to the frame, and a long strap comprising an end connected to the reel so that the reel is operable to wind the long strap, characterized in that each of the bushings comprises at least one recess and lubricant filled in the recess.

2. The self-lubricating tie-down according to claim 1, wherein each of the recesses is a longitudinal groove.

3. The self-lubricating tie-down according to claim 2, wherein each of the longitudinal grooves comprises two open ends.

4. The self-lubricating tie-down according to claim 2, wherein each of the longitudinal grooves comprises two closed ends.

5. The self-lubricating tie-down according to claim 1, wherein each of the recesses is an arched groove extending around the reel.

6. The self-lubricating tie-down according to claim 1, wherein each of the recesses is an annular groove.

7. The self-lubricating tie-down according to claim 1, wherein each of the recesses is in the form of a dot.

8. The self-lubricating tie-down according to claim 1, wherein the terminal sections of the reel extend beyond the ratchet wheels.

9. The self-lubricating tie-down according to claim 1, wherein the bushings extend toward each other.

10. The self-lubricating tie-down according to claim 1, wherein the bushings extend away from each other.

* * * * *